US007117168B2

United States Patent
Eaton

(10) Patent No.: US 7,117,168 B2
(45) Date of Patent: Oct. 3, 2006

(54) GIFT SELECTION AND FULFILLMENT SYSTEM

(75) Inventor: Francis W. Eaton, Framingham, MA (US)

(73) Assignee: Kidegift Inc., Natick, MA (US)

( * ) Notice: Subject to any disclaimer, the term of this patent is extended or adjusted under 35 U.S.C. 154(b) by 827 days.

(21) Appl. No.: 10/094,368

(22) Filed: Mar. 8, 2002

(65) Prior Publication Data

US 2003/0171997 A1    Sep. 11, 2003

(51) Int. Cl.
*G06Q 30/00*    (2006.01)
(52) U.S. Cl. ........................................................ 705/26
(58) Field of Classification Search .................. 705/26, 705/27, 14
See application file for complete search history.

(56) References Cited

U.S. PATENT DOCUMENTS

| | | | |
|---|---|---|---|
| 6,175,823 B1 * | 1/2001 | Van Dusen ................... | 705/26 |
| 6,321,211 B1 * | 11/2001 | Dodd ........................... | 705/26 |
| 6,609,106 B1 * | 8/2003 | Robertson ..................... | 705/26 |
| 2001/0049636 A1 * | 12/2001 | Hudda et al. .................. | 705/26 |
| 2001/0051876 A1 * | 12/2001 | Seigel et al. ................... | 705/1 |
| 2002/0143664 A1 * | 10/2002 | Webb ............................ | 705/27 |
| 2003/0004997 A1 * | 1/2003 | Parker et al. ................. | 707/513 |

FOREIGN PATENT DOCUMENTS

JP    63259718 A  * 10/1988

OTHER PUBLICATIONS

"Virtual Personal Shopper"; IBM Technical Disclosure Bulletin (NN970383), published Mar. 1, 1997, v40, i3; pp. 83-84.*

"Dot Coms in Derby City; Inventors Take Note of Louisville Internet Opportunities—WOWgift.com and c-z.com Emerge"; PR Newswire; New York; Mar. 2, 2000, p. 1.*

* cited by examiner

Primary Examiner—Jeffrey A. Smith
(74) Attorney, Agent, or Firm—Martin L. McGregor

(57) ABSTRACT

The invention provides a method for gift selection and fulfillment, especially suited to children, which comprises: contacting a potential gift giver by conventional advertising; providing information to the potential gift giver for contacting an order accepting system; obtaining an order from the gift giver that includes a set of gift selection criteria; supplying a computer program for comparing that is used for comparing the gift selection criteria with a set of gift selection rules; and generating a set of gift choices and storing the gift choices in a database record-keyed to a unique access code: notifying the recipient of the unique access code to make a gift choice by means of a connection to a computer network; generating a display of the available gift choices along with a personal message and photo of the gift giver, keyed to the unique access code; recording the recipient's gift selection and generating a delivery order for delivery of the gift selected to the recipient. The method may that further comprise obtaining from the gift giver information regarding other children to whom the gift giver wishes to give gifts on specified occasions; storing the information with gift giver contact information; and sending a reminder of the specified gift occasion to the gift giver to initiate a new gift selection and delivery. The method may include having the set of gift selection rules include special interest items. The method may also include gift selection rules that are provided by a team having one or more experts in child development, and with input from children.

20 Claims, 1 Drawing Sheet

GIFT SELECTION AND FULFILLMENT SYSTEM

TECHNICAL FIELD

The present invention relates to electronic commerce, and more specifically, to a system that enables electronic selection of a specific gift while not requiring use of a computer by the gift giver nor requiring disclosure of the recipient's electronic mail (e-mail) address. In a preferred embodiment the invention is especially suited for giving gifts to children.

BACKGROUND OF THE INVENTION

Several methods of gift distribution using the Internet are known. For example, U.S. Pat. No. 6,175,823 describes a system for purchasing, distributing and regaining electronic gift certificates. U.S. Pat. No. 6,321,211 describes methods and systems for electronically accepting and exchanging an online gift. However, the methods currently in use require the gift giver to have access to a computer in order to initiate the transaction. Each also requires that the proprietor of the gift selection business be provide with personal information regarding the recipient including the recipient's e-mail address or screen name. These characteristics of the prior art systems create a hardship for persons who lack computer literacy or access, and raise a privacy issue that is particularly sensitive where the recipient is a child. The present invention overcomes these problems by providing non-electronic gift purchase and notification mechanisms combined with an electronic gift selection system. This integrated system combines the speed and graphic display qualities of the internet with additional safeguards for privacy and communication security.

SUMMARY OF THE INVENTION

The invention provides a method for gift selection and fulfillment which comprises: contacting a potential gift giver by an advertising means not requiring use of a computer for receiving the advertising; providing information to the potential gift giver for contacting an order accepting means not requiring use of a computer; obtaining an order from the gift giver that includes a set of gift selection criteria, comparing the gift selection criteria with a set of gift selection rules; generating a set of gift choices and storing the gift choices in a database record, preferably a web site database record, keyed to a unique access code, notifying the recipient by a means other than electronic mail of the unique access code and instructions for making a gift choice by means of a connection to a computer network; in response to the unique access code, generating a display of the gift choices, preferably on a web site page of the World Wide Web; recording recipient gift selection and generating a fulfillment order for delivery of the recipient gift selection. In a preferred embodiment the invention further comprises obtaining from the gift giver information regarding other children to whom the gift giver wishes to give gifts on specified occasions; storing the information with gift giver contact information; and sending a reminder of the specified gift occasion to the gift giver to initiate a new gift selection and delivery. In a preferred embodiment the gift selection rules includes special interest items. Preferably the gift selection rules are provided by a team. The team may include experts in child development and the team will preferably also include children. In a preferred embodiment the age and gender of the recipient are considered in applying the gift selection rules.

The invention is especially suited to the needs of older persons not familiar with computer technology. The invention provides means for gift selection control and convenient gift selection, permitting to the recipient to select from a controlled group of gifts using the Internet but providing means to give the gift without requiring the giver to have access to the Internet, nor requiring disclosure of the recipient's e-mail address.

Alternatively the invention may be viewed as a method for gift selection for a child which comprises contacting a potential gift giver; obtaining information regarding the child including age, gender, address, birth date and special interests; comparing the information regarding the child to a set of gift choices selected by a plurality of child development experts; generating a set of gift choices for the particular child coded to a unique access code; supplying the unique access code to the child by means other than electronic mail (e-mail); providing the child with a web site display of available gift choices along with a personal message and photo of the gift giver; receiving a gift selection from the child and shipping the selected gift to the child. Preferably the method further comprises obtaining from the gift giver information regarding children to whom the gift giver wishes to give gifts on specified occasions; storing the information with gift giver contact information; and sending a reminder of the specified gift occasion to the gift giver to initiate a new gift selection and delivery.

DETAILED DESCRIPTION OF THE INVENTION

Figure 1:
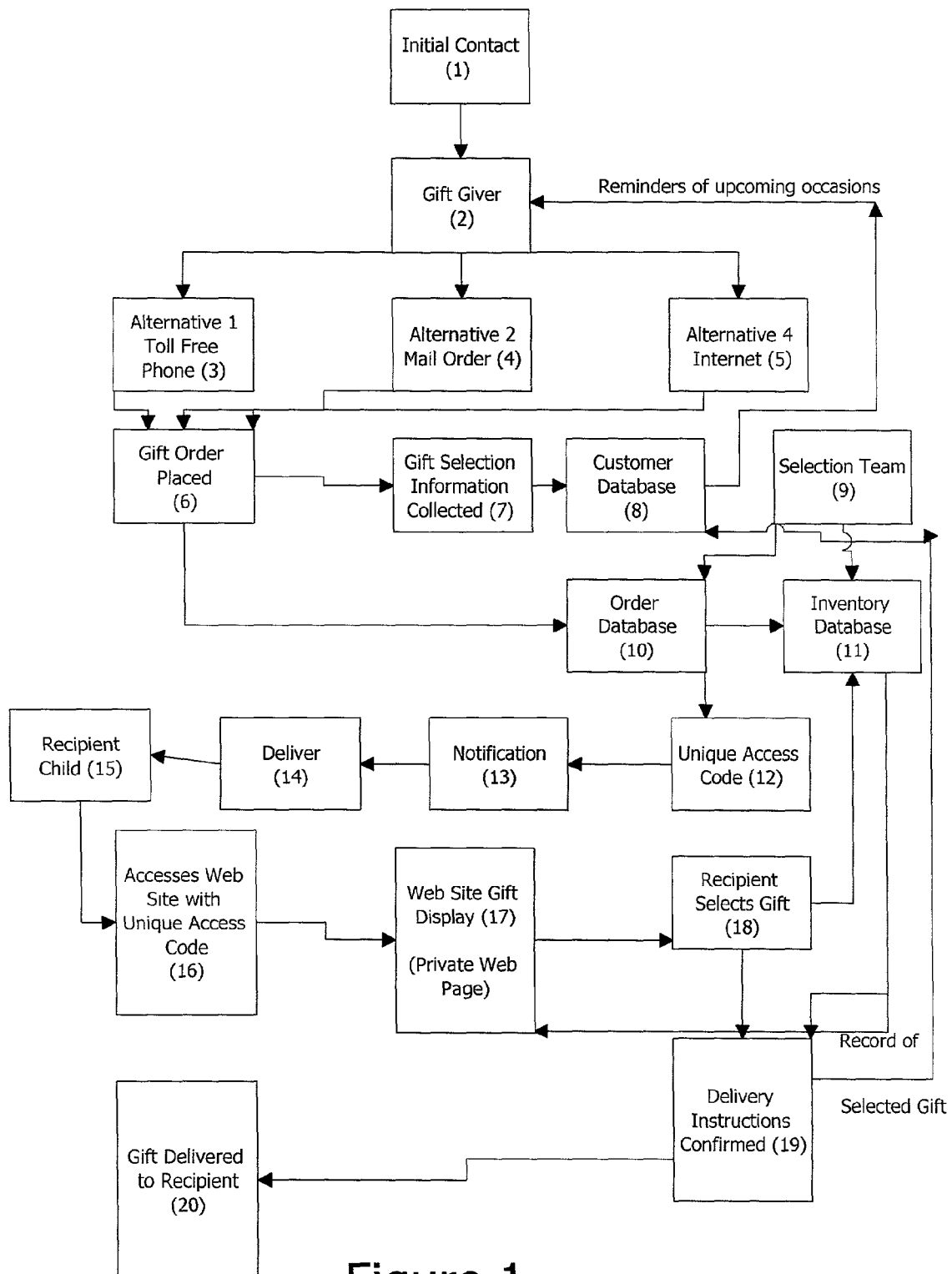
FIG. 1 is a Flow Chart of the Gift Selection and Fulfillment Method.

The invention provides means for communicating with potential gift givers, such as grandparents, aunts, uncles and the like and providing them with the benefit of expert guidance in the selection of appropriate gifts, especially gifts for children between the ages of one and 13 without requiring the use of a computer by the gift giver. For example, the potential gift giver is contacted through conventional advertising media, not requiring access to a computer or the Internet. As used herein, conventional advertising media means radio, television, a newspaper, direct mail, and the like and is intended to encompass all advertising media other than the Internet or other extended computer network. The gift purchase is completed by the gift giver by communication with the gift distribution system by methods not requiring use of a computer. For example, a giver may place the order by phone, direct mail or by other means. The gift giver supplies pertinent information including the recipient's age, gender, birth date and selects a price point to define the gift selection criteria. The order information is relayed to a gift selection system and the criteria compared to gift selection rules for selecting age- and gender-appropriate gifts. The gift selection system provides a plurality of gift selections within the price criteria and forwards the information to the gift delivery system. Optionally the gift giver may supply a personalized message for the recipient, which may include a photograph. The gift delivery system notifies the recipient of the gift and provides access directions for selection of the actual gift item via the Internet. For example, the givers name, the child's name and address, gift selection instructions and a unique access code are automatically printed on a gift notification form that is mailed to the child. The form provides directions for the child (or for a parent to assist the child) to log onto an Internet web site to select a present from the giver. The unique access code will permit the recipient to access the web site and to select from a controlled group of appropriate gifts but to make the final gift choice for his or her self. The form will also provide an alternative for gift selection if Internet access is unavailable. The unique access code and gift information is stored in a database that controls access to a gift redemption web site. When a user provides the unique access code, a gift selection display is provided with instructions for gift selection. The recipient then makes the gift selection and confirms delivery address. The gift redemption web site then relays delivery information and a shipping order to a gift delivery center which supplies the selected gift to the child.

EXAMPLE 1

Turning to FIG. 1, a typical gift selection and fulfillment system is represented. An initial customer contact is made by conventional advertising means such as a direct mail solicitation, advertisement, phone call, personal contact at a booth or the like. The initial contact (1) to the customer requests an order and that the giver be ready to supply information for gift selection as well as delivery instructions and, optionally, for a personalizing message and photograph. The gift giver (2) responds by supplying recipient-specific information to the gift selection system by the gift order system (6) which collects gift selection information (7), as well as delivery instructions and payment. The response may be by any of several alternatives shown schematically as Alternatives 1–3 [references (3), (4) and (5)]. For example Alternative 1 may be a toll free telephone response (3), Alternative 2 may be a mail order (4) and Alternative 3 may be by contacting a web site on the Internet (5). Payment may be by credit card or by other means. The gift selection information (7) is stored in the customer database (8) and the order system also generates a payment confirmation process and, when payment is confirmed, enters the order in the order database (10). The gift selection system compares the customer supplied data with gift selection rules, preferably established by the Selection Team (9) and selects an appropriate list of items from the potential gifts listed in the Inventory Database (11). An output list of age- and gender-appropriate potential gifts is provided and keyed to a Unique Access Code (12) and forms the private page for the Web Site Gift Display (17). The Unique Access Code is added to a gift notice (13) which is delivered (14) to recipient with instructions for connection to the gift selection web site to access Web Site Gift Display (17). Alternative instructions may also be provided to cover the possibility that the recipient may not have Internet access at home. Such instructions may include, for example, suggestions to use an Internet computer at school, the public library or at a friend's house, or it may include a toll free number where the selection can be made by phone. The gift selection (18) is made by the child optionally with parental assistance and the delivery instructions confirmed (19). The gift selection (18) is supplied to inventory database (11) to reduce the level of available inventory and the selected gift is shipped to the recipient (20). In a preferred embodiment the gift giver 2 supplies a personalized message and photograph that are displayed with the Web Site Gift Display (17).

The Web Site Gift Display (17) will display a plurality of gift choices optionally with pictures, animations or other illustrations of the gift items and instructions for selection. The recipient makes a choice and confirms delivery address and other information. The gift selection choices provided based on the gift selection rules established by the gift selection expert. This process may be automated or individualized selections may be made by an appropriate expert, based on the gift givers instructions and the gift price point selected.

In an alternate embodiment the invention comprises gift selection for a child including contacting a potential gift giver; obtaining information regarding the child such as age, gender, address, birth date and special interests; comparing the information regarding the child to a set of gift choices selected by a plurality of child development experts; generating a set of gift choices for the particular child coded to a unique access code; supplying the unique access code to the child; providing the child with a display of available gift choices along with a personal message and photo of the gift giver; receiving a gift selection from the child and shipping the selected gift to the child.

A team of child development experts may supply a set of age- and gender-appropriate criteria for gift selection, which may be formulated as a set of selection rules, which may be stored in a computer system. The team may also include children whose input will be evaluated and tempered by the child development experts among the team members. The information from the gift giver is compared to the gift selection rules to provide a master list of appropriate gift choices which generates a private web page as part of the Web Site Gift Display (17) keyed to a Unique Access Code (12).

The selection criteria may be generated by a plurality of child development experts, who review available toys for age- and gender-appropriate safe toys, games and the like. The child development experts have special training, and experience and expertise in play and social interaction, safety and the like. The gift selection team may also include children. The gift giver may also be given periodic reminders of gift occasions and the like.

I claim:

1. A method for gift selection and fulfillment which comprises: advertising to a potential gift giver; providing information to the potential gift giver for placing an order; obtaining an order from the gift giver that includes a set of gift selection criteria; using a computer program for comparing the gift selection criteria with a set of gift selection rules; generating a set of gift choices based on said gift selection criteria and said set of gift selection rules and storing the set of gift choices in a computer database record that includes a unique access code; notifying a gift recipient of the unique access code with instructions to make a gift selection from the set of gift choices by establishing a connection to a computer network; in response to the unique access code transmitted by the gift recipient generating a display of the set of gift choices; recording the gift recipient's gift selection and generating a delivery order for delivery of the gift selected to the gift recipient.

2. A method according to claim 1 that further comprises obtaining from the gift giver information regarding additional persons to whom the gift giver wishes to give gifts on specified occasions; storing the information with gift giver contact information; and sending a reminder of the specified gift occasion to the gift giver to initiate a new gift selection and delivery.

3. The method of claim 1 wherein the set of gift selection rules includes special interest items.

4. The method of claim 1 wherein the gift selection rules are provided by a plurality of child development experts.

5. The method of claim 1 wherein age and gender are considered in generating the set of gift choices.

6. The method of claim 1 wherein the display of the set of gift choices includes a personal message and photo of the gift giver.

7. A method for gift selection and fulfillment for a child which comprises contacting a potential gift giver; obtaining an order for a gift from the gift giver including information regarding the child including age, gender, birth date and special interests; using a computer program for comparing the information regarding the child to a plurality of potential gift choices selected by a team that includes at least one child development expert; generating a set of gift choices for the child based on said information regarding the child and said potential gift choices coded to a unique access code; supplying the unique access code to the child; providing the child with a display of the set of gift choices by a computer network from a location remote from the child; receiving a gift selection from the child transmitted over a computer network and shipping the selected gift to the child.

8. A method according to claim 7 that further comprises obtaining from the gift giver information regarding other children to whom the gift giver wishes to give gifts on specified occasions; storing the information with gift giver contact information; and sending a reminder of the specified gift occasion to the gift giver to initiate a new gift selection and delivery.

9. A method according to claim 7 wherein the team includes at least one child.

10. The method of claim 7 wherein the plurality of potential gift choices includes special interest items.

11. The method of claim 7 wherein the plurality of potential gift choices are provided by a plurality of child development experts.

12. The method of claim 7 wherein age and gender are considered in generating the set of gift choices.

13. The method of claim 7 wherein the display of the set of gift choices includes a personal message and photo of the gift giver.

14. A method for gift selection and fulfillment for a child which comprises: advertising to a potential gift giver; providing information to the potential gift giver for placing an order; obtaining an order from the gift giver that includes a set of gift selection criteria; using a general purpose computer for comparing the gift selection criteria with a set of gift selection rules formulated by a team comprising a child development expert; generating a set of gift choices based on said gift selection criteria and said gift selection rules and storing the set of gift choices in a database record keyed to a unique access code; notifying the child of the unique access code to make a gift selection from the set of gift choices by use of a connection to a computer network; in response to a connection established with the unique access code generating a display of the set of gift choices along with a personal message and photo of the gift giver, keyed to the unique access code; recording the child's gift selection and generating a delivery order for delivery of the gift selected to the child.

15. A method according to claim 14 that further comprises obtaining from the gift giver information regarding other children to whom the gift giver wishes to give gifts on specified occasions; storing the information with gift giver contact information; and sending a reminder of the specified gift occasion to the gift giver to initiate a new gift selection and delivery.

16. The method of claim 14 wherein the set of gift selection rules includes special interest items.

17. The method of claim 14 wherein the gift selection rules are provided by a team comprising a plurality of child development experts.

18. The method of claim 17 wherein the gift selection rules are provided by a team including a plurality of child development experts with additional input from one or more additional children.

19. The method of claim 17 wherein there is input from at least one additional child whose age is within one year of the age of the child.

20. The method of claim 14 wherein age and gender are considered in generating the set of gift choices.

* * * * *